METHOD OF PRODUCING A MAGNETIC STORAGE MEDIUM

Original Filed March 10, 1969 2 Sheets-Sheet 1

Aug. 7, 1973 G. E. WILHELM ET AL 3,751,345

METHOD OF PRODUCING A MAGNETIC STORAGE MEDIUM

Original Filed March 10, 1969 2 Sheets-Sheet 2

United States Patent Office 3,751,345
Patented Aug. 7, 1973

3,751,345

METHOD OF PRODUCING A MAGNETIC STORAGE MEDIUM

George E. Wilhelm and Stanley S. Nagy, Studio City, and Moon T. Hahn, Santa Monica, Calif., assignors to Sperry Rand Corporation Original application Mar. 10, 1969, Ser. No. 805,573, now Patent No. 3,595,630. Divided and this application July 9, 1971, Ser. No. 161,328
Int. Cl. C23f 5/50, 5/52, 17/00
U.S. Cl. 204—29 15 Claims

ABSTRACT OF THE DISCLOSURE

A magnetizable storage member is formed from a substrate and thin layers deposited on the substrate. The thin layers include an element having properties of initially being non-magnetic and of becoming magnetizable when subjected to heat at a particular elevated temperature. A thin chemically inert layer is disposed between the thin magnetizable layers. The magnetizable layers may be nickel and the chemically inert layer may be gold. The magnetizable storage member is provided with magnetic properties corresponding to those provided by a storage member having iron oxide layers. A hard, thin, non-magnetic protective coating may be disposed on the storage member and may be made from a silicone.

Figure 1:
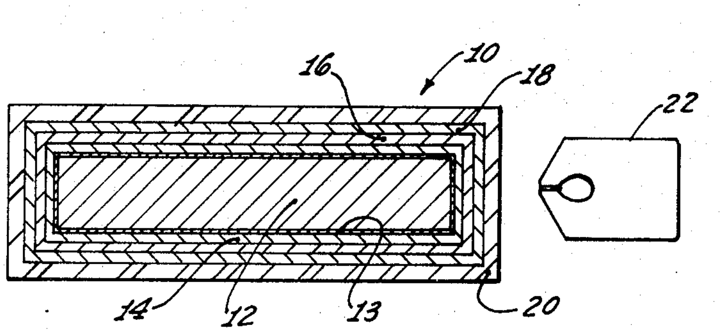

The storage member is formed from the different layers discussed above and is then baked at the particular elevated temperatures to make the storage member magnetizable.

This is a division of application Ser. No. 805,573, filed Mar. 10, 1969, now U.S. Letters Pat. No. 3,595,630.

This invention relates to storage media for use with a magnetic transducer to obtain the recording of information on the media and the subsequent reproduction of such information from the media during the relative movement of the media past the transducer. The invention particularly relates to magnetic storage media having electroless or electroplated depositions with magnetic characteristics corresponding substantially to those provided by media with layers of iron oxide. The invention also relates to methods of producing such magnetic media.

Magnetic storage media such as discs are used to store information for use in computers. For example, the information may represent inventory in department stores or scientific measurements obtained from transducers. Magnetic transducers are disposed in contiguous relationship to the magnetic storage media to record information in magnetic form from the media or to reproduce the recorded information from the media.

The magnetic storage media now in use have layers of iron oxide to store the magnetic information. The layers of magnetic information have certain response characteristics. Since the magnetic characteristics of the storage media are provided by the layers of iron oxide on the media and since the media are supplied primarily by one computer company which has a market share greater than the combined market share of all of the other computer companies, the performance characteristics of the storage media are set by this computer company. In order for the storage media of other companies to operate properly, their response characteristics must be compatible with the response characteristics of the storage media supplied by the leading computer company.

In addition to magnetic storage media with coatings of iron oxide, magnetic storage media are also provided with layers of elements electrolessly or electrolytically deposited on a substrate with magnetic properties. For example, layers of nickel and cobalt have been electrolessly or electrolytically deposited on a substrate to form magnetic storage media. The media formed with coatings of nickel and cobalt have certain advantages in comparison to those formed with coatings of iron oxide. One advantage is that substantially all of the material in the electroless or electrolytic depositions has magnetic properties whereas the oxygen in the coatings of iron oxide has no magnetic properties. Another advantage is that the iron oxide is considerably more abrasive than electroless or electrolytic depositions of nickel or cobalt so that magnetic transducers tend to become worn or damaged relatively quickly when contacted by the iron oxide. A further advantage is that magnetic storage media using electroless or electrolytic depositions are able to operate satisfactorily through a greater frequency range than those using iron oxide.

Various attempts have been made to provide electroless or electrolytic depositions of nickel or cobalt with response characteristics corresponding to those provided by iron oxide so that magnetic storage media having the response characteristics of those using iron oxides but the advantages of those using electroless or electrolytic depositions can be obtained. Such results have not been very successful.

This invention provides magnetic storage media with electroless or electrolytic magnetic depositions having magnetic characteristics corresponding to those of iron oxide. The storage media have further advantages in that neither the media nor the magnetic head operating in conjunction with the media are damaged when the head inadvertently contacts the media. Another advantage is that the media constituting this invention operate satisfactorily through a greater frequency range than the media using iron oxide.

The media constituting this invention include a first magnetic layer electrolessly or electrolytically deposited from a suitable element such as nickel. A chemically inert layer formed from a suitable element such as gold is deposited on the first magnetic layer. A second magnetic layer is electrolessly or electrolytically deposited on the chemically inert layer and may be formed from a suitable element such as nickel. The first and second magnetic layers preferably have a combined thickness in the order of twenty (20) to one hundred (100) micro inches. A thin protective coating of a hard, non-magnetic material such as a silicone may be disposed on the second magnetic layer to prevent the magnetic layers from being damaged and to prevent the head from being damaged upon contact between the storage media and the magnetic head.

The invention also includes methods of forming the magnetic storage media. As a first step in forming the magnetic storage media, the element constituting the first magnetizable layer is deposited on a suitable substrate such as aluminum in a form having non-magnetic characteristics. The chemically inert layer is then deposited on the first magnetizable layer and the element constituting the second magnetizable layer is subsequently deposited on the chemically inert layer in a form having non-magnetic characteristics. The protective coating is applied on the second magnetizable layer as a next step when the protective coating is included. The magnetic storage media are then baked at a suitable temperature such as approximately 750° F. for a particular period of time such as approximately two (2) hours to convert the element in the first and second non-magnetic layers to a magnetizable form.

Figure 3:
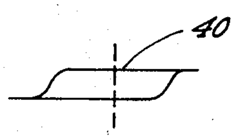
Figure 4:
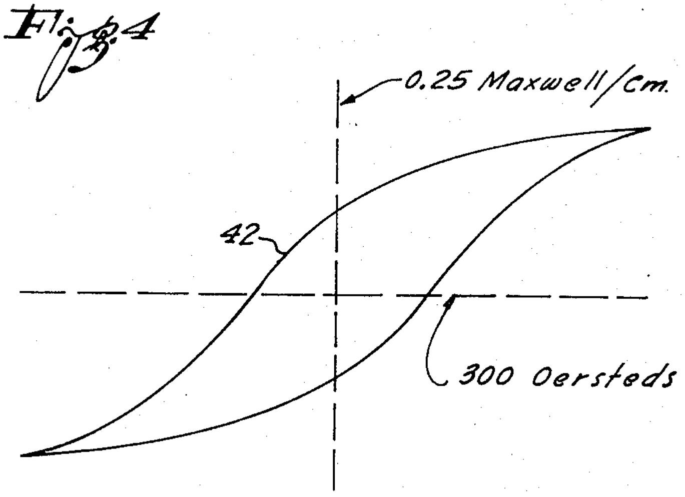
Figure 2A:
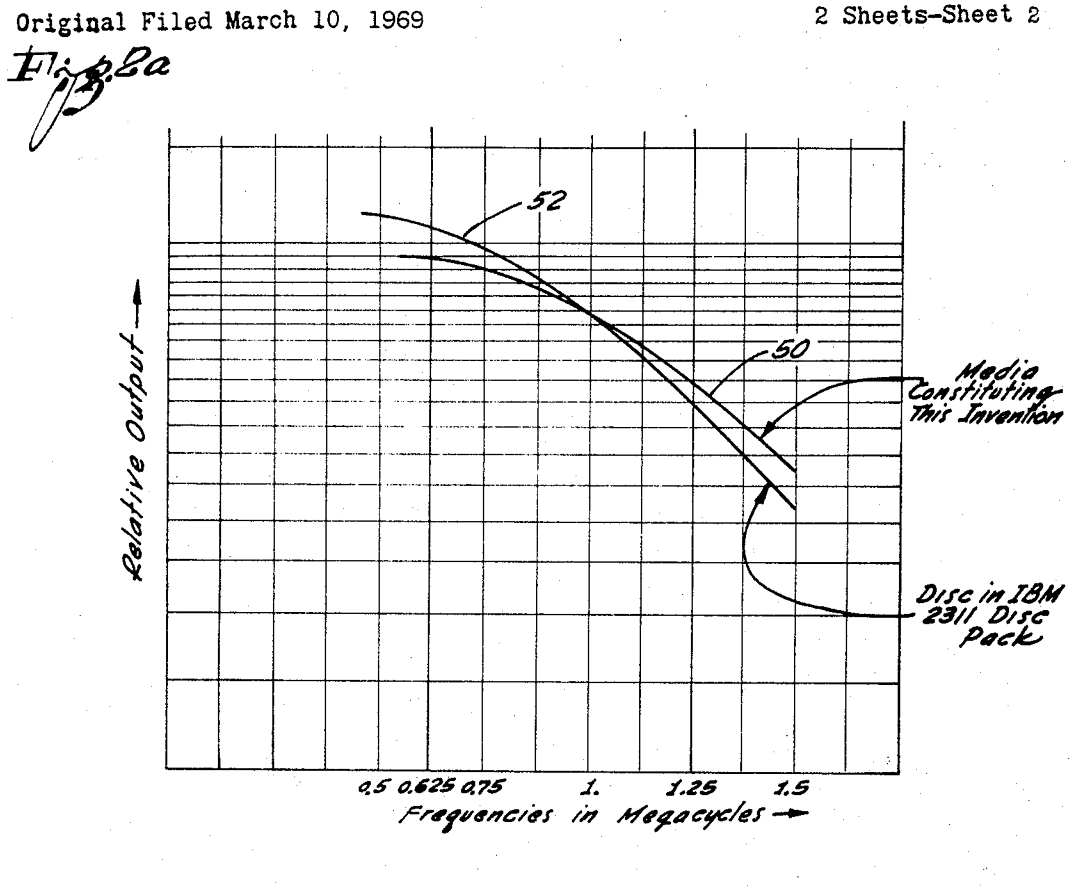
Figure 2B:
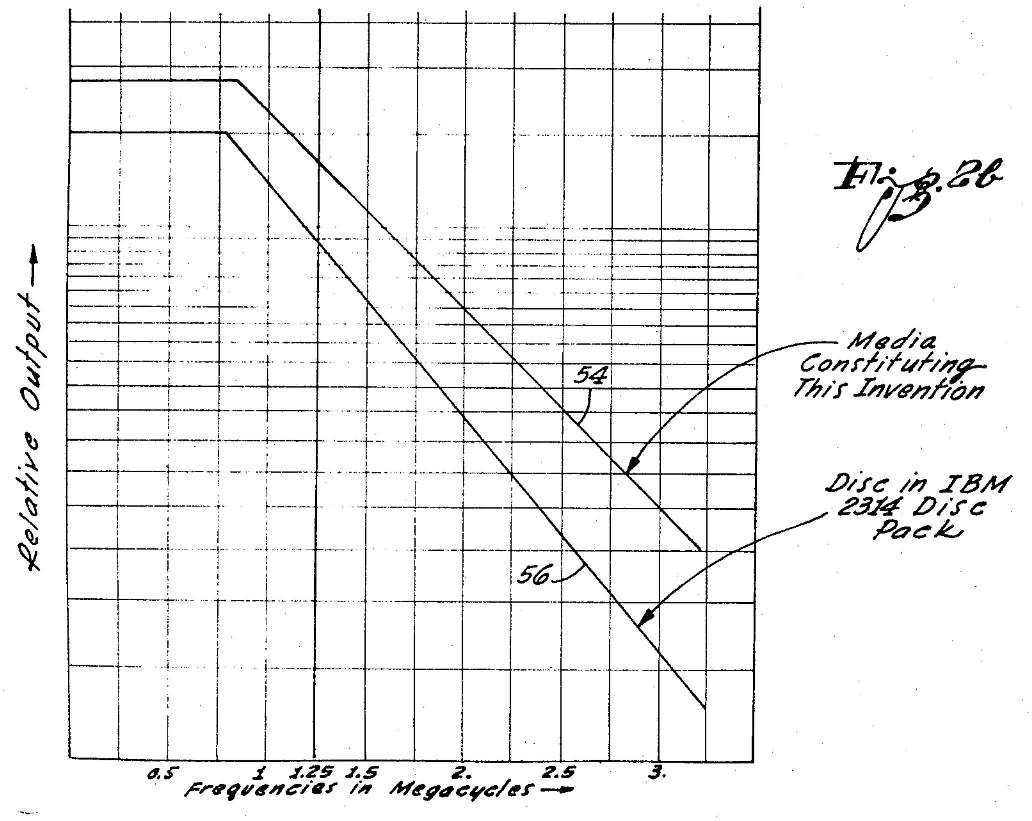

In the drawings:

FIG. 1 is a sectional view of a magnetic storage medium, such as a disc, constituting one embodiment of the invention;

FIGS. 2*a* and 2*b* illustrate response curves of output versus frequency of various embodiments of the magnetic storage medium shown in FIG. 1 and the magnetic storage media of the prior art;

FIG. 3 illustrates a hysteresis response curve of the magnetic stortge medium shown in FIG. 1 before the medium has been baked at elevated temperatures as one of the steps in the methods included in this invention; and FIG. 4 illustrates a hysteresis response curve of the magnetic storage medium shown in FIG. 1 after the medium has been baked at elevated temperatures as one of the steps in the method included in this invention.

In the embodiment of the invention shown in FIG. 1, a magnetic storage medium included within the concepts of this invention constitutes a disc generally indicated at 10 although other media than discs may be used. The magnetic storage medium 10 includes a substrate 12 made from a suitable material such as aluminum. Aluminum is advantageous because it is relatively light and can be easily accelerated or decelerated to any desired speed. Aluminum is also advantageous because it can be formed more easily than many other materials to provide a substantially uniform surface on which thin layers of magnetic material can be deposited. Furthermore, since aluminum is relatively strong, it does not become deformed even if it should be subjected to relatively great impact forces by contact with a magnetic transducing head as it is moved past the head.

A very thin layer 13 of magnetizable nickel having a thickness in the order of five (5) microinches is deposited on the substrate 12. A thin layer 14 of a suitable magnetizable material such as nickel is electrolessly or electrolytically deposited on the layer 13. The layer 14 of magnetizable material preferably has a thickness of approximately ten (10) to twenty (20) microinches. Preferably, the layer 14 is initially in a non-magnetizable state but is converted to a magnetizable state after it has been baked at a particular temperature such as 750° F. for a suitable period of time such as approximately two (2) hours.

Certain of the ingredients included in the bath to produce the layer 14 are preferably obtained from the Stapleton Company of Glendale, Calif., and are designated by that company under the trademark "Sta Buff." These ingredients include a salt, such as the sulfate, of a material such as nickel initially having non-magnetic properties but subsequently having magnetic properties upon the application of heat. To provide the layer 14 with non-magnetic characteristics which can be converted to magnetic characteristics in the finished medium upon the application of heat, the nickel is included in the layer 14 in a range of approximately 87% to 93% by weight with phosphorus constituting essentially the remainder by weight. Preferably, nickel and phosphorus are included in the layer 14 in respective weights of approximately 90% and 10%.

A thin layer 16 of a chemically inert material such as gold is disposed on the thin layer 14 of magnetic material. The thin layer 16 may be provided with a suitable thickness such as a thickness in the order of ten (10) to one hundred (100) microinches. In addition to gold, other chemically inert materials such as silver, platinum and palladium may also be used as may any other noble metal. Copper is another material which may also be used for the layer 16. Gold is advantageous, however, for certain important reasons. It is easily applied and is relatively inexpensive in comparison to the other noble metals. Furthermore, it can be applied in a single bath whereas certain of the other noble metals such as silver generally have to be applied in two (2) baths, one to apply a flash layer and the other to provide the desired thickness.

A second thin layer 18 of a magnetizable material is disposed on the chemically inert layer 16. The layer 18 is provided with magnetizable characteristics corresponding substantially to those of the layer 14. Certain of the materials included in the bath to produce the layer 18 are also preferably obtained from the Stapleton Company of Glendale, Calif., and are designated by that company under the trademark "Sta Buff." The nickel is included in the layer 18 in a range of approximately 87% to 93% by weight with phosphorus constituting essentially the remainder by weight so that the nickel can initially be provided with non-magnetizable characteristics but can be converted to magnetizable characteristics in the finished product upon the application of heat. Preferably nickel and phosphorus are included in the layer 14 in respective weights of approximately 90% and 10%.

The combined thickness of the layers 14 and 18 is in the range of approximately twenty (20) to one hundred (100) microinches. When the magnetic characteristics of the magnetic storage medium constituting this invention are intended to correspond to those of the IBM 1316 disc pack to produce approximately 1125 bits per inch or approximately 2250 flux reversals per inch, the combined thickness of the layers 14 and 18 is approximately one hundred (100) microinches. The combined thickness of the layers 14 and 18 is approximately seventy-five (75) microinches when the magnetic characteristics of the magnetic storage medium constituting this invention are intended to correspond to those of the IBM 2316 disc pack to produce approximately 2250 bits per inch or approximately 4550 flux reversals per inch.

The magnetic storage medium 10 may be produced in a manner similar to that described below. When the substrate 12 constitutes aluminum, it is cleaned of dirt and other impurities and prepared in a conventional manner so that a fresh surface of aluminum is presented. A chemical solution of sodium zincate is then applied in a conventional manner to the freshly prepared surface of the aluminum substrate to exchange aluminum ions with zinc ions on this surface. The chemical solution of sodium zincate may be obtained from the Enthone Corporation of New Jersey under the trademark "Alumon D." The zincated surface of the substrate 10 is then rinsed with tap water and dried.

The flash coating or layer 13 of a suitable material such as magnetizable nickel is then applied as by electroless deposition to the zincated surface of the substrate. The electroless deposition may be applied in a conventional manner at somewhat elevated temperatures by an electroless bath having a pH of at least eight (8) to make the nickel magnetic. When nickel is magnetic, it tends to have a composition of at least 93% by weight, with the remainder being phosphorous. Magnetic nickel is advantageous because, it adheres well to the zincated surface and because it tends to remove loose zincate from the surface. This results in part because magnetic nickel does not have as great an affinity to the zincate as non-magnetic nickel, which tends to adhere the loose zincate to the aluminum substrate.

In one particular electroless bath, the following materials may be used:

| Material: | Percentage by weight |
|---|---|
| Sodium citrate | 10. |
| Sodium potassium tartrate | 5. |
| Versene (complexing agent salt) | 1.6. |
| Sodium hypophosphite | 1.6. |
| Nickel sulphate | Sufficient to create at least 93% nickel in the electroless deposition. |
| Ammonium hydroxide | Sufficient to create a pH of approximately 9. |

In the electroless bath specified in the previous paragraph, "Versene" is the tetrasodium salt of ethylenediamine-tetraacetic acid. The hypophosphite salt in the electroless bath specified in the previous paragraph constitutes a reducing agent to reduce the metallic salts to a metal for the deposition on the prepared surface of the backing element 12. The citrate and tartrate salts also serve as buffers. Versene also serves as a complexing agent, and the ammonia acts to maintain the pH of the solution within particular limits such as between 8 and 10. The electroless bath is applied at a suitable temperature such as a temperature between approximately 70° F. and 80° F. This bath is instrumental in depositing the magnetic nickel at a particular rate such as approximately one (1) microinch per minute. Although the flash coating has been described as being produced by electroless techniques, it will be appreciated that the flash coating may be produced by electroplating the nickel on the aluminum surface.

After the application of the flash coating of magnetic nickel, the surface of the substrate is again preferably rinsed. The layer 14 of non-magnetic nickel is then applied to the surface of the magnetic nickel as by an electroless bath. This bath may be formed in a manner similar to that described above except that a pH of six (6) or below is provided and the nickel ions are disposed in the bath to provide a concentration of nickel in the layer 14 in a range of approximately eighty-seven percent (87%) to ninety-three percent (93%) by weight. Preferably the bath has a pH of approximately 4. The bath is provided with a temperature of approximately 80° C. to 85° C. and is applied for a period of approximately ten (10) minutes to produce a thickness of approximately eighteen (18) to twenty (20) microinches for the nickel layer 14. The nickel deposited in the layer 14 is initially non-magnetic. Although the layer 14 of non-magnetic nickel has been described as being produced by electroless techniques, it will be appreciated that the layer 14 may also be produced by electroplating.

The surface of the substrate is preferably rinsed and dried. The chemically inert layer 16 such as gold is then applied in a conventional manner as by an electrolytic plating process. The gold is applied for a suitable period of time such as approximately two (2) minutes at a suitable temperature in the order of 30° C. to 35° C. The surface of the substrate is again preferably rinsed and dried, and the layer 18 of a suitable material such as nickel is applied to the substrate as by an electroless bath in a manner similar to the layer 14. The layer 18 of nickel is initially non-magnetic in a manner similar to the layer 14.

A thin coating 20 of silicone varnish may be subsequently applied to the substrate under dust-free conditions and the substrate such as the disc is spun at relatively high speeds to make the thickness of the varnish substantially uniform and to remove excess varnish and to allow the coating to harden. As will be appreciated, the coating of silicone varnish does not have to be applied to the substrate to produce the magnetic storage medium constituting this invention.

The medium such as the disc is then baked for a particular period of time such as approximately two (2) hours at a particular temperature such as approximately 750° F. This temperature is greater than that at which magnetic media are normally baked. The baking occurs in air although it may also occur in a neutral medium such as nitrogen. The medium is then cooled in the oven for about an hour with the fan on so that the temperature becomes approximately 500° F. at the end of the hour. The medium is then disposed in air at ambient temperatures and cooled or it may be maintained in the oven with the fan on.

Before the medium is heat treated, it has a hysteresis curve similar to that shown at 40 in FIG. 3. In the curve shown in FIG. 3, the coercivity of the medium is shown along the abscissa and the retentivity is shown along the ordinate. As will be seen, the flux density and coercivity of the material such as nickel in the medium are fairly low before the material is heat treated. After the material has been heat treated, the medium has a hysteresis curve such as shown at 42 in FIG. 4. As illustrated in FIG. 4, the magnetic characteristics of the material increase substantially to a coercivity of approximately three hundred (300) oersteds plus or minus (±) ten percent (10%) and a flux density of approximately .25 maxwells/cm.

The magnetic storage media constituting this invention has output characteristics for different frequencies such as shown at 50 in FIG. 2*a*. FIG. 2*a* also illustrates at 52 the output characteristics of discs in the IBM 2311 disc pack for different frequencies. As will be seen, the response characteristics of the magnetic storage media constituting this invention are approximately ten percent (10%) lower than the response characteristic of the disc in the IBM 2311 disc pack at a frequency of approximately 0.625 megacycle and are approximately ten percent (10%) higher than the response characteristics of the disc in IBM 2311 disc pack at a frequency of approximately 1.25 megacycles. However, as shown in FIG. 2*b*, the response characteristics of the magnetic storage media constituting this invention are higher than the response characteristics of the discs in the IBM 2314 disc pack at frequencies of approximately 1.25 and 2.5 megacycles. This may be seen from a comparison of a response curve 54 of a magnetic storage medium constituting this invention and a response curve 56 of a disc in an IBM 2314 disc pack.

Although applicants are not certain as to the exact operation of their invention, the following explanation appears to have some basis in fact. The inner layer 14 of magnetic material provides several different functions. It tends to become absorbed in the pores of the substrate 12 so that it does not have a finite thickness approaching the thickness of approximately eighteen (18) to twenty (20) microinches with which it is applied. The layer 14 also provides a vehicle by which the layer 16 of gold can be effectively bonded to the substrate 12. If the layer 14 were not included, the gold layer 16 could not be bonded easily on a direct basis to the substrate 12. The layer 14 also has hard characteristics so that it protects the aluminum substrate 12 against becoming pitted or dented when a head 22 in FIG. 1 contacts the medium 10. Since the layer 13 is also hard, it offers substantially the same protective advantages as the layer 14. However, the layer 18 also protects the layer 16 from becoming dented or pitted when the head 22 contacts the medium 10.

The layer 16 also appears to have certain important functions. It separates the layer 18 of magnetic material from the layer 14 of magnetic material so that the material in the layer 18 cannot leak through the layer 16 into the layer 14. It also provides a good chemical bond for the material in the layers 14 and 18. In this way, the thickness of the material in the layer 18 can be maintained at a substantially uniform value so that the response characteristics of the magnetic medium 10 can be repeated on a production basis.

A thin coating 20 of a protective material such as a silicone may be disposed on the surface of the magnetic layer 18 before the medium such as the disc is baked at selected temperatures. When a silicone is used, the silicon may be Silicon 1377 varnish manufactured by Dow Corning. This constitutes a silicon which is dissolved in methyl Cellosolve and which is provided with a silicium carbon bond. The silicone coating preferably has a thickness in the order of a few microinches.

The silicone coating has certain important advantages. It is insoluble in commonly used solvents including water and is chemically inert after being cured and provides protection against the environment. It also causes the external surface of the magnetic storage medium to be hard and slippery so that a magnetic head 22 disposed in contiguous relationship to the medium 10 tends to bounce from the medium upon any contact with the medium.

This minimizes any tendency for the magnetic head 22 to damage the medium or affect the magnetic characteristics of the medium upon a contact between the head and the medium as the medium moves past the head. For example, in previous coatings corresponding to the coating 20, the coating has been removed upon contact with the head so as to expose the layer of magnetic material and cause the magnetic material to be removed upon further contact with the head. The silicone coating also prevents the head 22 from being damaged as by an abrasive action if the medium contacts the head as the medium moves past the head. Contact between the medium 10 and the head 22 becomes an increasing likelihood as the packing density of the information on the head increases since the spacing between the medium and the head decreases with increased packing densities.

Although the invention has been described on the basis that the magnetic layer 18 is nickel, it will be appreciated that other magnetic material may be used. For example, combinations of nickel and cobalt and combinations of nickel and iron may be electrolessly deposited on the medium to form the layer 18. Preferably the magnetic layer 18 is composed primarily of nickel.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A method of producing a member for storing magnetic information to provide for a recording of the magnetic information on the member and the reproduction of the magnetic information from the member, including the steps of:

providing a non-magnetic substrate,
depositing on the non-magnetic substrate a first thin layer of an element initially having non-magnetic characteristics but having properties of becoming converted to magnetic characteristics when subjected to heat at a particular temperature,
depositing on the first thin layer a second thin layer of a chemically inert material,
depositing on the second thin layer a third thin layer including an element having non-magentic characteristics but having properties of becoming converted to magnetic characteristics when subjected to heat at the particular temperature, and
baking the member at the particular temperature for a particular period of time to make the first and third layers magnetic.

2. The method set forth in claim 1 wherein the member is baked at a temperature of approximately 750° F. for a period of approximately two (2) hours.

3. The method set forth in claim 1 wherein a hard thin coating of a non-magnetic plastic material is disposed on the third thin layer.

4. The method set forth in claim 1 wherein the first and third layers are nickel and the second layer is gold.

5. The method set forth in claim 1 wherein the total thickness of the first and third layers has a particular value dependent upon the packing density of the information to be recorded on the member and to be reproduced from the member.

6. The method set forth in claim 1 wherein the first and third thin layers are electrolessly deposited and the second thin layer is electroplated.

7. The method set forth in claim 1 wherein the first and third layers are nickel and the second layer is gold and the first and third layers have a combined thickness in the order of twenty (20) to one hundered (100) microinches and the gold has a thickness in the order of ten (10) to one hundred (100) microinches and a coating of silicone is disposed on the third layer to provide the external surface of the member with considerable hardness.

8. A method of producing a member for storing magnetic information to provide for a recording of the magnetic information on the member and the reproduction of the magnetic information from the member, including the steps of:

providing an aluminum substrate,
depositing on the substrate a first layer of very thin dimensions and of an element having magentic properties,
depositing on the first layer a second layer of thin dimensions, the second layer including an element having non-magnetic properties but having properties of becoming magnetizable when subjected to heat at particular temperatures,
depositing a third layer of thin dimensions on the second layer, the third layer comprising a chemically inert material,
depositing a fourth layer of thin dimensions on the third layer, the fourth layer including an element having non-magnetic properties but having properties of becoming magnetizable when subjected to heat at the particular temperatures, and
baking the member at the particular temperatures for a period of time to make the second and fourth layers magnetic.

9. The method set forth in claim 8 wherein the substrate is aluminum and the first, second and fourth layers include nickel and the third layer is gold.

10. The method set forth in claim 9 wherein the first layer has a thickness in the order of five (5) microinches, the second and fourth layers have a combined thickness in the order of twenty (20) to one hundred (100) microinches and the gold has a thickness in the order of ten (10) one hundred (100) microinches.

11. The method set forth in claim 10 wherein the member is baked for approximately one to two hours at a temperature of approximately 750° F.

12. The method set forth in claim 11 wherein a thin silicone coating is applied to the fourth thin layer before the member is baked for approximately one to two hours at a temperature of approximately 750° F.

13. The method set forth in claim 8 wherein a thin coating of a hard, protective, non-magnetic material is applied to the fourth thin layer before the member is baked at the particular temperature.

14. The method set forth in claim 13 wherein the thin coating is a silicone and wherein the first, second and fourth thin layers are electrolessly deposited and the third thin layer is electroplated.

15. The method set forth in claim 8 wherein the first, second and fourth thin layers are electrolessly deposited and the third thin layer is electroplated.

References Cited

UNITED STATES PATENTS

| | | | |
|---|---|---|---|
| 3,350,180 | 10/1967 | Croll | 117—239 |
| 3,119,753 | 1/1964 | Mathias et al. | 117—240 |

JOHN H. MACK, Primary Examiner

R. L. ANDREWS, Assistant Examiner

U.S. Cl. X.R.

204—30, 37 R, 38 B; 117—71 M, 75, 239, 240